(12) United States Patent
Yang et al.

(10) Patent No.: US 10,841,560 B2
(45) Date of Patent: Nov. 17, 2020

(54) 3D DIGITAL IMAGE CORRELATION USING SINGLE, COLOR CAMERA PSEUDO-STEREO SYSTEM

(71) Applicant: Oakland University, Rochester, MI (US)

(72) Inventors: Lianxiang Yang, Rochester Hills, MI (US); Junrui Li, Auburn Hills, MI (US); Guobiao Yang, Rochester Hills, MI (US); Wan Xu, Auburn Hills, MI (US); Boyang Zhang, Auburn Hills, MI (US)

(73) Assignee: Oakland University, Rochester, MI (US)

( * ) Notice: Subject to any disclaimer, the term of this patent is extended or adjusted under 35 U.S.C. 154(b) by 0 days.

(21) Appl. No.: 16/480,829

(22) PCT Filed: Jan. 30, 2018

(86) PCT No.: PCT/US2018/015904
§ 371 (c)(1),
(2) Date: Jul. 25, 2019

(87) PCT Pub. No.: WO2018/144437
PCT Pub. Date: Aug. 9, 2018

(65) Prior Publication Data
US 2019/0394446 A1    Dec. 26, 2019

Related U.S. Application Data

(60) Provisional application No. 62/452,536, filed on Jan. 31, 2017.

(51) Int. Cl.
*H04N 13/218*  (2018.01)
*H04N 13/257*  (2018.01)
(Continued)

(52) U.S. Cl.
CPC .......... *H04N 13/218* (2018.05); *G01B 11/16* (2013.01); *G01B 11/24* (2013.01); *H04N 13/254* (2018.05); *H04N 13/257* (2018.05)

(58) Field of Classification Search
None
See application file for complete search history.

(56) References Cited

U.S. PATENT DOCUMENTS

| 3,825,335 A | 7/1974 | Reynolds |
| 2008/0231854 A1 | 9/2008 | Seifert et al. |

(Continued)

FOREIGN PATENT DOCUMENTS

| CN | 106093051 A | 11/2016 |
| KR | 10-2015-0094948 A | 8/2015 |
| WO | 2016/166668 A1 | 10/2016 |

OTHER PUBLICATIONS

International Preliminary Report, PCT/US2018/015904, dated Aug. 6, 2019.

(Continued)

*Primary Examiner* — Heather R Jones
(74) *Attorney, Agent, or Firm* — Fishman Stewart PLLC

(57) ABSTRACT

An imaging system includes a first light source configured to provide a first light to an object, a second light source configured to provide a second light to said object, a color camera configured to capture an image of the object, a first mirror disposed between the first light source and said object, a second mirror disposed between the second light source and said object, a beam splitter disposed between the color camera and said object, a first filter for the first light source, a second filter for the second light source, and a processor configured to determine at least one of a shape, a deformation, and a strain measurement of said object from the image.

18 Claims, 12 Drawing Sheets

(51) Int. Cl.
*H04N 13/254* (2018.01)
*G01B 11/16* (2006.01)
*G01B 11/24* (2006.01)

(56) References Cited

U.S. PATENT DOCUMENTS

| | | | |
|---|---|---|---|
| 2012/0032946 A1* | 2/2012 | Wang | G06T 7/85 345/419 |
| 2012/0256879 A1 | 10/2012 | Liu et al. | |
| 2016/0265900 A1* | 9/2016 | Yang | G01L 1/24 |
| 2016/0320176 A1 | 11/2016 | Yang et al. | |

OTHER PUBLICATIONS

International Search Report PCT/US2018/15904, dated Apr. 2, 2018.

* cited by examiner

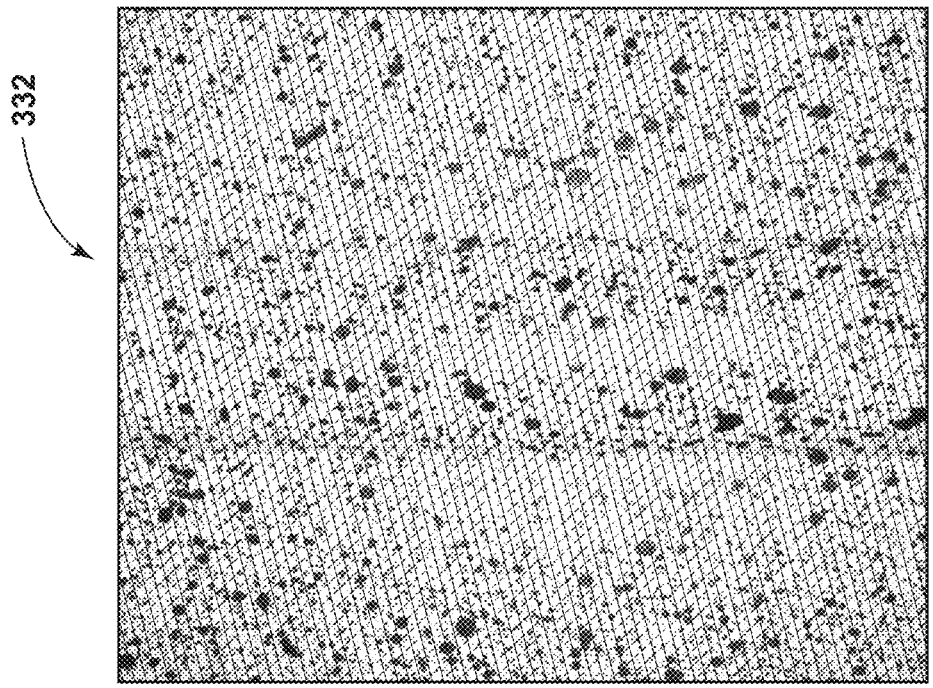
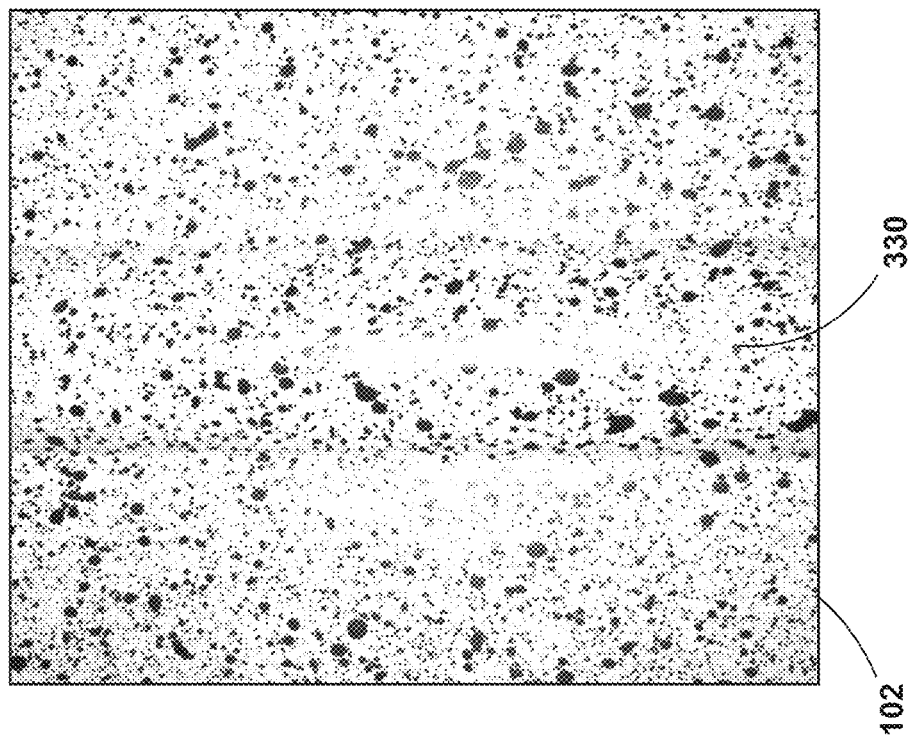
FIG. 5B
FIG. 5A

3D DIGITAL IMAGE CORRELATION USING SINGLE, COLOR CAMERA PSEUDO-STEREO SYSTEM

CROSS-REFERENCE TO RELATED APPLICATION

This application is a National Stage Patent Application of International Patent Application No. PCT/US2018/15904, filed Jan. 30, 2018. This application claims the benefit of U.S. Provisional Patent Application Ser. No. 62/452,536, filed on Jan. 31, 2017, the disclosure of which is hereby incorporated herein by reference in its entirety.

TECHNICAL FIELD

The present disclosure relates to imaging methods and systems that may be used in connection with measuring stress, strain, and/or deformation. Strain measurement is often used in a variety of applications, including manufacturing, biomedical, and microelectronics, among others. For example, aircraft are often analyzed using imaging systems.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Conventional imaging systems may involve certain drawbacks, such as being relatively complex and/or expensive. For example and without limitation, conventional systems may require a plurality of cameras and triggering systems, and/or may not be configured for use with small measurement areas. Some imaging systems may involve refraction, such as systems that employ a prism or biprism. However, refraction-based systems may introduce relatively large aberrations to resulting images and/or may split a camera sensor into two halves, which may effectively reduce the maximum spatial resolution by half relative to a two-camera system.

There is a desire for solutions/options that minimize or eliminate one or more challenges or shortcomings of imaging systems. The foregoing discussion is intended only to illustrate examples of the present field and should not be taken as a disavowal of scope.

SUMMARY

The present disclosure includes an imaging system that may include a first light source configured to provide a first light to an object, a second light source configured to provide a second light to said object, and/or a color camera configured to capture an image of said object. The image may include the first light and the second light. Embodiments of a system may include a first mirror disposed between the first light source and said object, a second mirror disposed between the second light source and said object, a beam splitter cube disposed between the color camera and said object, a first filter for the first light source, and/or a second filter for the second light source. Systems may include and/or may be connected to a processor/computer configured to process the image and/or determine at least one of a shape, a deformation, and a strain measurement of said object from the image.

Various aspects of this disclosure will become apparent to those skilled in the art from the following detailed description, when read in light of the accompanying drawings.

BRIEF DESCRIPTION OF THE DRAWINGS

FIG. 5A is an image of an object for evaluation.

FIG. 5B is an image of the object of FIG. 5A captured via an embodiment of an imaging system according to aspects or teachings of the present disclosure.

DETAILED DESCRIPTION

Reference will now be made in detail to embodiments of the present disclosure, examples of which are described herein and illustrated in the accompanying drawings. While the disclosure will be described in conjunction with embodiments and examples, it will be understood that they are not intended to limit the disclosure to these embodiments. On the contrary, the disclosure is intended to cover alternatives, modifications, and equivalents.

Figure 1:
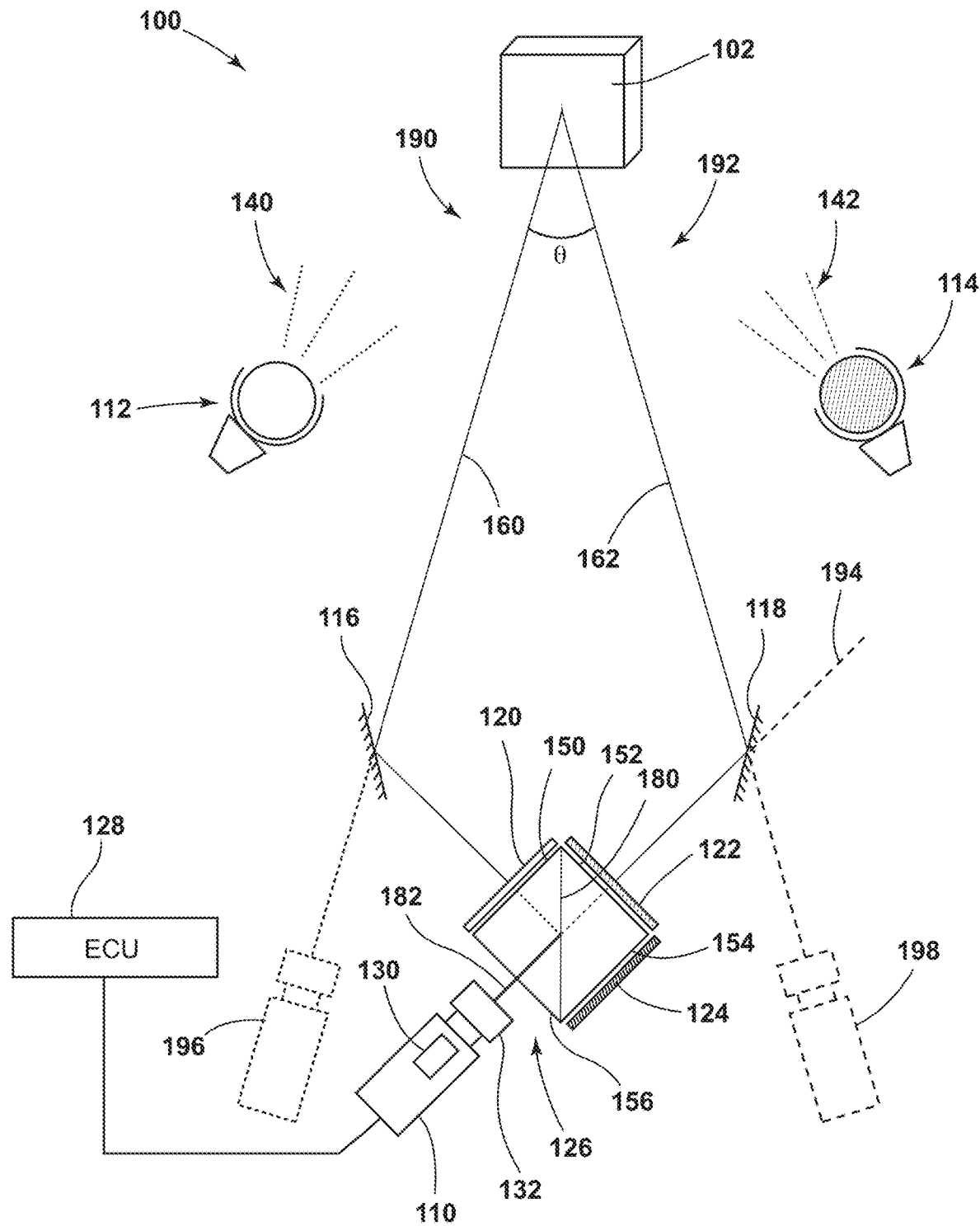
FIG. 1 is a schematic view of an embodiment of an imaging system according to aspects or teachings of the present disclosure.

As generally illustrated in FIG. 1, embodiments of an imaging system 100 may include a single color camera three-dimensional digital image correlation (3D-DIC) system that may be configured to evaluate and/or measure an object 102 or portions thereof. A system 100 may include a single camera 110, one or more light sources (e.g., a first light source 112 and a second light source 114), one or more reflective surfaces/mirrors (e.g., a first mirror 116 and a second mirror 118), one or more filters (e.g., a first filter 120 and a second filter 122), a light shield or barrier 124, a beam splitter 126, and/or an electronic control unit (ECU) 128. If a single light source is used, the light source may be configured to provide light of multiple colors, such as, for example and without limitation, colors across the light spectrum from red to blue.

In embodiments, a single camera 110 may be configured as a color camera and/or may include a sensor 130 that may have one or more charge-coupled devices (CCD). Non-limiting examples of cameras that may be utilized include the HV-F202SCL and the HV-F202GV made available by Hitachi, but other cameras may be utilized. A camera 110 may include relatively high resolution, such as, for example and without limitation, about 1600 pixels by about 1200 pixels. A camera 110 may provide good sensor response in the frequency domain (spectral sensitivity), such as generally illustrated in the graph 134 of FIG. 2. A camera 110 may include a lens 132, such as a fixed focal length lens. A camera 110 may be configured as a high-speed camera that may be used for dynamic applications.

With embodiments, a first light source 112 and/or a second light source 114 may be configured to provide light to the object 102. The first light source 112 and the second light source 114 may be configured to provide a first light 140 and a second light 142, respectively. In embodiments, the first light 140 and the second light 142 may include wavelengths between about 400 nm and 700 nm. The first light 140 and the second light 142 may include different wavelengths. For example and without limitation, the first light may be between about 550 nm and about 700 nm, such as about 600 nm (e.g., may be red) and/or the second light may be between about 400 nm and about 500 nm, such as about 450 nm (e.g., may be blue).

A light source 112, 114 may include one or more of a variety of configurations. For example and without limitation, the first light source 112 and/or the second light source 114 may include one or more light emitting diodes (LEDs) and/or high power impulsed light. In embodiments, the first light source 112 and the second light source 114 may be adjustable. For example and without limitation, if the first light source 112 provides red light, the first light source 112 may be set to be stronger than the second light source 114, which may provide blue light, to compensate for a difference in the spectral sensitivity of the sensor 130 of the camera 110 (e.g., a CCD chip).

With embodiments, a system 100 may include a first reflective surface/mirror 116 and a second reflective surface/mirror 118. The first and second mirrors 116, 118 may include one or more of a variety of shapes, sizes, configurations, and/or materials. For example and without limitations, the first mirror 116 and the second mirror 118 may be configured as 30 mm mirrors that may be placed at a certain angle θ (e.g., a 20 degree angle) to observe the object 102 from different perspectives. The angle θ between the mirrors 116, 118 may vary depending on the application and/or may be adjustable. A stereo angle of the system 100 may be around 20 degrees, which may correspond to and/or be determined by the angle between the mirrors 116, 118.

In embodiments, a system 100 may include one or more filters (e.g., optical filters). For example and without limitation, a system 100 may include a first filter 120 and a second filter 122. The first filter 120 and the second filter 122 may be configured for different wavelengths. For example and without limitation, the first filter 120 and/or the second filter 122 may be configured as band-pass filters with the first filter 120 being configured to pass light and reflections from the first light source 112 (e.g., red light that may be between about 550 nm and about 700 nm, such as about 600 nm) and the second filter 122 being configured to pass light and reflections from the second light source 114 (e.g., blue light that may be between about 400 nm and about 500 nm, such as about 450 nm). With embodiments, a first filter 120 may be connected to and/or aligned with a first side 150 of the beam splitter 126. A second filter 122 may be connected to and/or aligned with a second side 152 of the beam splitter 126. For example and without limitation, light may not be permitted to enter the first side 150 except through the first filter 120 and/or may not be permitted to enter the second side 152 except through the second filter 122.

In embodiments, a first reflection 160, such as the first light 140 from the first light source 112 reflecting off of the object 102 toward the first mirror 116, may reflect off of the first mirror 116 and may travel toward the first filter 120. The first filter 120 may permit the first reflection 160 to pass through the first filter 120 to the beam splitter 126 and/or the first filter 120 may prevent some or all other light from passing through the first filter 120 or reaching the first side 150 of the beam splitter 126. With embodiments, a second reflection 162, such as the second light 142 from the second light source 114 reflecting from the object 102 toward the second mirror 118, may reflect from the second mirror 118 and may travel toward the second filter 122. The second filter 122 may allow the second reflection 162 to pass through the second filter 122 to the beam splitter 126 and/or the second filter 122 may prevent some or all other light from passing through the second filter 122 or reaching the second side 152 of the beam splitter 126.

With embodiments, a system 100 may include a light shield or barrier 124. A light shield 124 may be aligned with and/or connected to a beam splitter 126, such as with/to a third side 154 of a beam splitter 126. The light shield 124 may prevent light from entering and/or exiting the third side 154 of the beam splitter 126.

With embodiments, a system 100 may include a beam splitter 126. A beam splitter 126 may include one or more of a variety of shape, sizes, configurations, and/or materials. For example and without limitation, a beam splitter 126 may be configured as broadband beam splitter cube (e.g., a 25.4 mm broadband beam splitter cube) and may be placed in front of the camera 110 (e.g., optically between the filters 120, 122 and the camera 110). A beam splitter 126 may include a first side (or port) 150, a second side 152, a third side 154, and a fourth side 156 (and a top and bottom). The first side 150 and the third side 154 may be disposed substantially in parallel with each other. The second side 152 and the fourth side 156 may be disposed substantially in parallel with each other. The first side 150 and the third side 154 may be disposed substantially perpendicular to the second side 152 and the fourth side 156. A beam splitter 126 may include an inner wall or portion 180 that may extend diagonally (e.g., from an intersection of the first wall 150 and the second wall 152 to an intersection of the third wall 154 and the fourth wall 156). The inner portion 180 may be configured to reflect some (e.g., about 50%) of the light that enters the beam splitter 126 and to transmit a remainder of the light that enters the beam splitter 126. For example and without limitation, the beam splitter 126 may be configured to reflect about 50% of the first reflection 160 toward the camera 110 and/or to transmit about 50% of the second reflection 162 toward the camera 110, which may provide a combined light or light beam 182 to the camera 110 that includes (e.g., simultaneously) at least some of the first reflection 160 and at least some of the second reflection 162.

In embodiments, a first optical path 190, such as of the first light 114 of the first light source 112 (or the first reflection 160), may include the test object 102, the first mirror 116, the first filter 120, the beam splitter 126, and/or the camera 110. The first mirror 116 may be disposed optically (e.g., in the first optical path 190) between the test object 102 and the first filter 120, the first filter 120 may be disposed optically between the first mirror 116 and the beam splitter 126, and/or the beam splitter 126 may be disposed optically between the first filter 120 and the camera 110. A second optical path 192, such as of the second light 142 of the second light source 114 (or the second reflection 162), may include test object 102, the second mirror 118, the second filter 122, the beam splitter 126, and/or the camera 110. The second mirror 118 may be disposed optically (e.g., in the second optical path 192) between the test object 102 and the second filter 122, the second filter 122 may be disposed optically between the second mirror 118 and the beam splitter 126, and/or the beam splitter 126 may be disposed optically between the second filter 122 and the camera 110.

With embodiments, a color camera 110 may be utilized to simultaneously capture two reflections or views (e.g., the first reflection 160 and the second reflection 162), which may have different wavelengths. The two views may be captured, for example and without limitation, in the red domain and blue domain separately (or domains of a different combination of two suitable colors). With a single color camera 3D-DIC system 100, both views may use/occupy a whole CCD sensor or chip 130 of the single camera 110, and no spatial resolution reduction may occur. The center of the two views may stand/be disposed in the center of the CCD sensor 130, which may be similar to and/or the same as with a conventional 3D-DIC system 200 (see, e.g., FIG. 3), and an optical axis 194 of the lens 132 may coincide with the optical paths 190, 192 of the views. Such a configuration may minimize the image distortion due to the pseudo-stereo configuration of the system 100 and may meet assumptions of DIC processing methods.

In embodiments, a system 100 may include a pseudo-stereo setup that may be configured to emulate, at least in some respects, systems with more than one camera. For example and without limitation, embodiments of system 100 may function, effectively, as if the system 100 included two cameras, such as the virtual cameras 196, 198 generally illustrated in FIG. 1.

Figure 2:
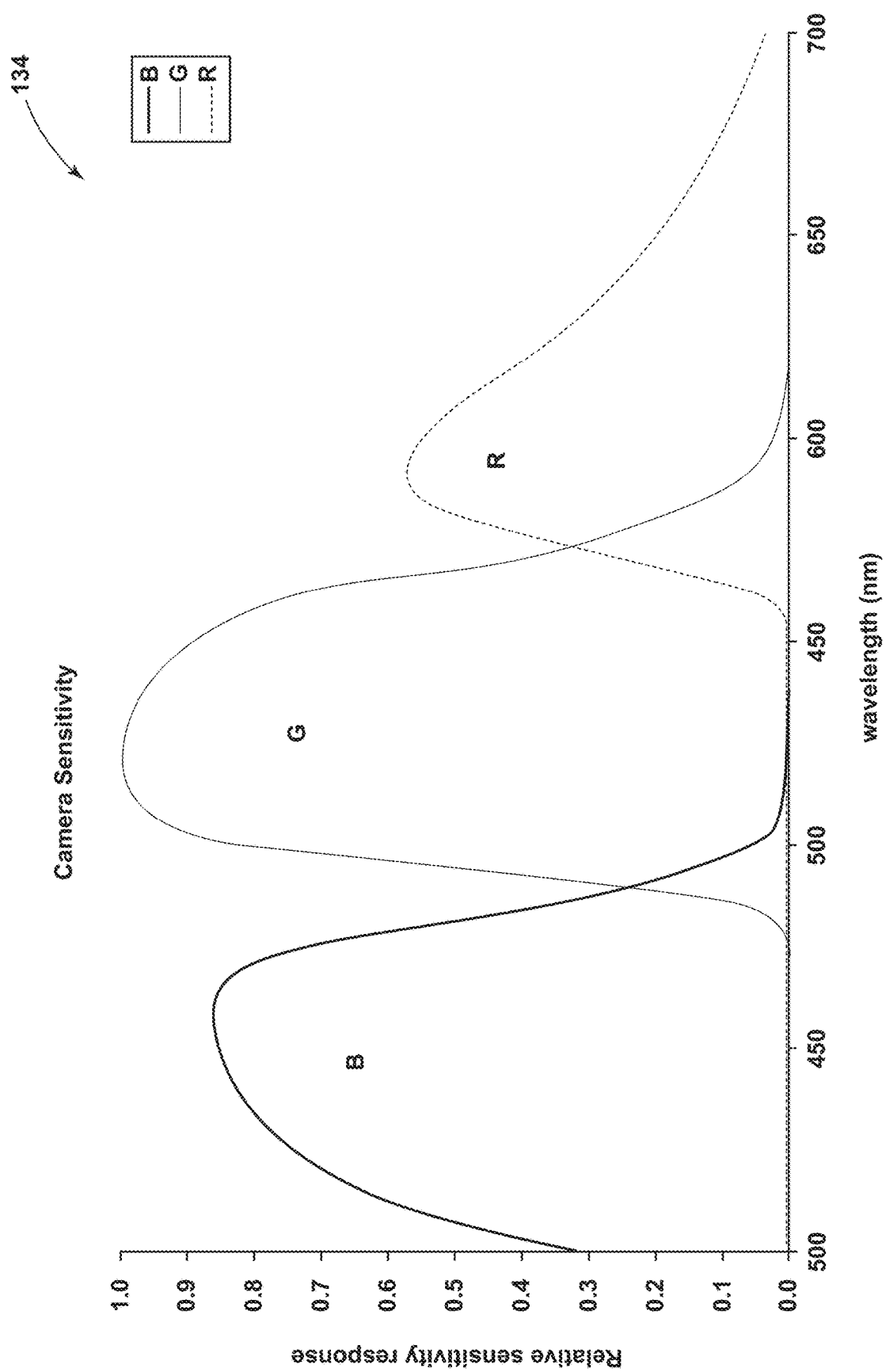
FIG. 2 is a graphical view of a spectral sensitivity of a camera of an embodiment of an imaging system according to aspects or teachings of the present disclosure.

In embodiments of the present disclosure, a system 100 may utilize different wavelengths of two views of a single image captured by a single camera 110 to analyze the single image. Methods of DIC, which may be carried out at least in part by an ECU 128, may be insensitive to the wavelength of the processed image(s). This may enable the frequency domain (wavelength domain) to be utilized to separate two views of a single image instead of the spatial domain, which may be used in other systems. Additionally, the camera 110 may provide sufficient sensor response in the frequency domain (spectral sensitivity), such as generally illustrated in FIG. 2, which may help ensure that the views separated by the wavelengths are still separable in a CCD sensor 130 of the camera 110.

Figure 4:
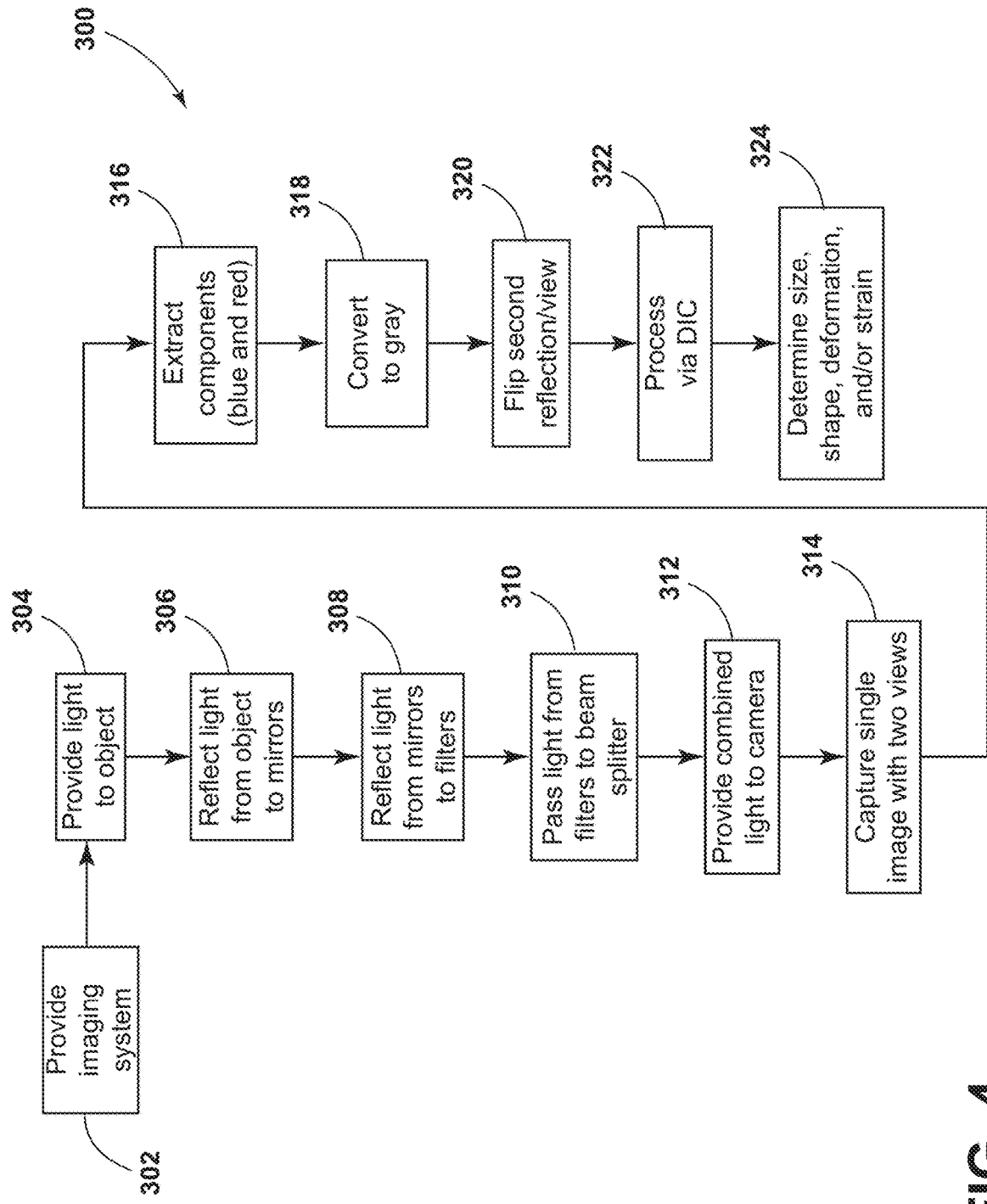
FIG. 4 is a flow diagram of a method of utilizing an imaging system according to aspects or teachings of the present disclosure.

In embodiments, such as generally illustrated in FIG. 4, an imaging method 300 may include providing an imaging system 100 (step 302). An imaging system 100 may be configured as a reflection-based pseudo-stereo system and may be utilized to obtain two views of a test object 102 with different perspectives via a single camera 110. A first light source 112 and a second light source 114, which may be configured to provide light of different wavelengths, may illuminate the test object 102 (step 304). A first reflection 160 and a second reflection 162, which may include views on the left and right sides of the test object 102, respectively, may be reflected to two reflective surfaces/mirrors 116, 118 (step 306). The first and second reflections 160, 162 may then be reflected to a first filter 120 (e.g., a red filter) and a second filter 122 (e.g., a blue filter), respectively, that may be placed in front of the beam splitter 126, such as optically between the mirrors 116, 118 and the beam splitter 126 (step 308). The reflections 160, 162 may pass through the filters 120, 122 and may enter the beam splitter 126 (step 310). The beam splitter 126 may combine the two reflections 160, 162 into a combined light or reflection 182 that may include a single different wavelength and/or that may be provided or reflected to the camera 110 (step 312). The two filtered views (red and blue) with different perspectives may be captured (e.g., simultaneously) by the camera 110 via the combined reflection 182 (step 314). The two views may be recorded in a single color image, and the red component and the blue component may remain separable, at least for DIC. The two views with different perspectives may be extracted by extracting the red/blue components of the single color image (step 316) and converting the components to respective gray values (step 318). As the view/component from the second optical path 192 (e.g., the blue component) may only be reflected once, the second component may be flipped horizontally to obtain a compensated view (step 320). The two gray images may then be evaluated using a standard 3D-DIC method (step 322) and/or a size, shape, deformation, and/or strain of a test object 102 may be determined (step 324).

Embodiments of a system 100 may be utilized, configured, and/or validated in one or more of a variety of ways. For example, and without limitation, three types of analyses/validations for a system 100 with a single, color camera 3D-DIC configuration will be described in greater detail. First, a morphology analysis/test may be conducted to measure the shape of a specimen/object 102 with a curved surface. Second, a rigid-body movement analysis/test may be conducted to measure the in-plane and out-of-plane movement/deformation. Lastly, a tensile analysis/test may be conducted. A measured strain from the tensile analysis may be compared with the results obtained from a commercial 3D-DIC system 200, which may include a plurality of cameras 202, 204 (see, e.g., FIG. 3). Software, such as Istra 4D marketed by Dantec Dynamics may, for example, be used for the manipulation/evaluation.

Figure 6B:
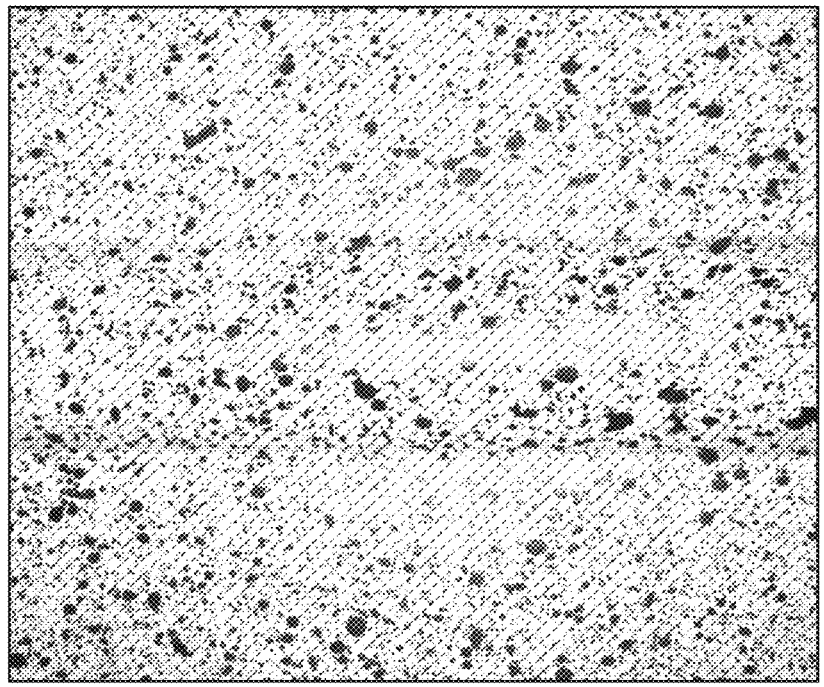
FIG. 6B is a blue component of the image of FIG. 5B.
Figure 6A:
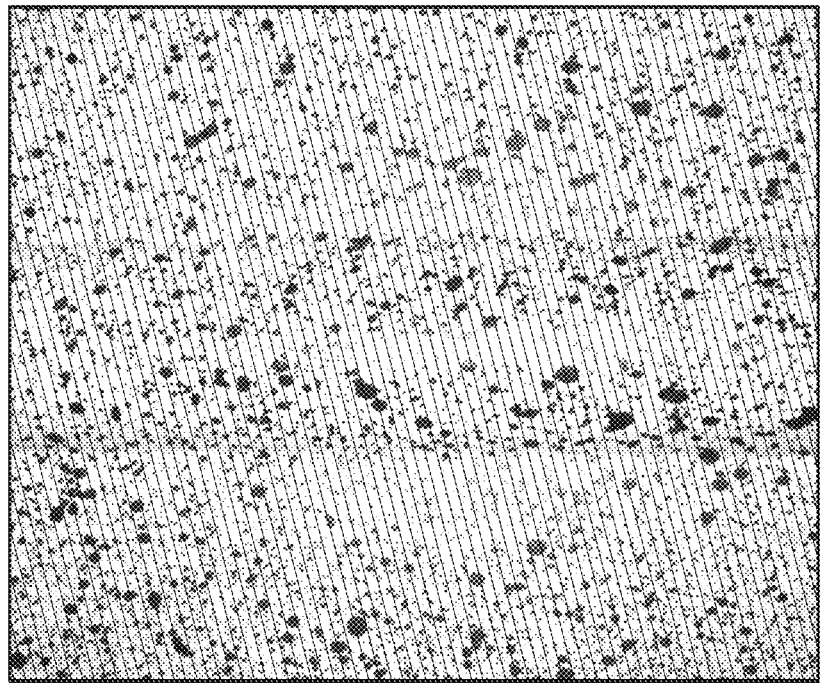
FIG. 6A is a red component of the image of FIG. 5B.
Figures 7A, 7B:
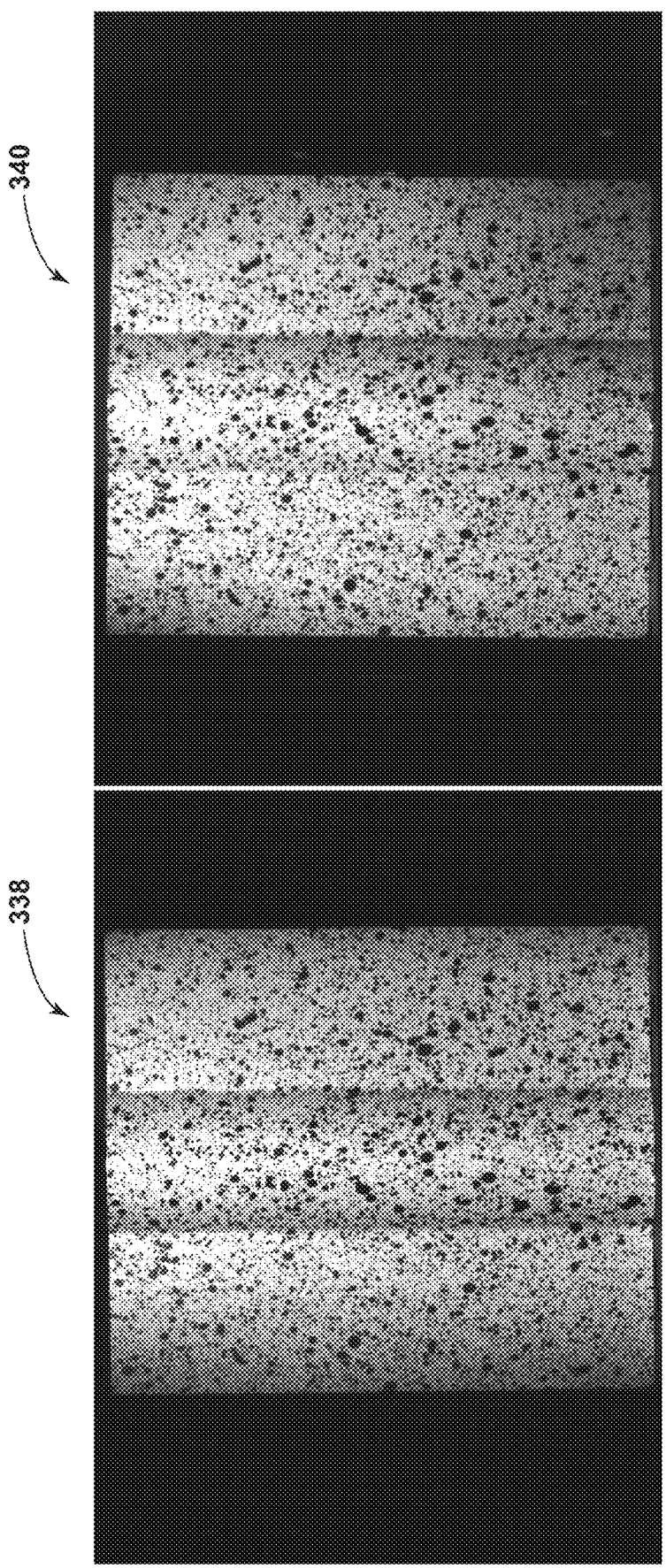
FIG. 7A is a gray image transformed from the image of FIG. 6A.
FIG. 7B is a gray image transformed from the image of FIG. 6B.
Figures 8A, 8B:
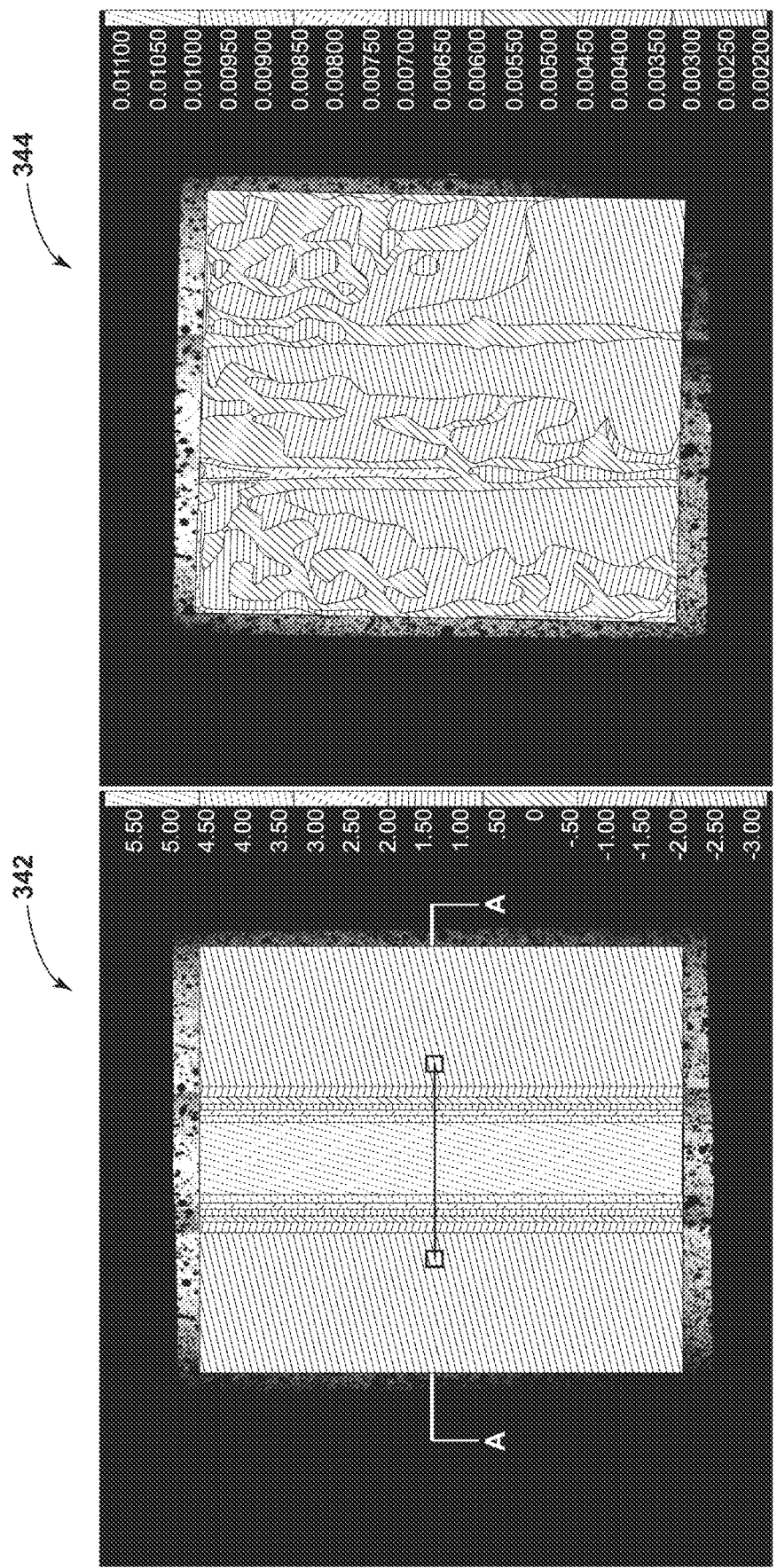
FIG. 8A is a cloud map of a contour measured via a conventional 3D-DIC system.
FIG. 8B is an estimated error map corresponding to the cloud map of FIG. 8A.
Figure 9:
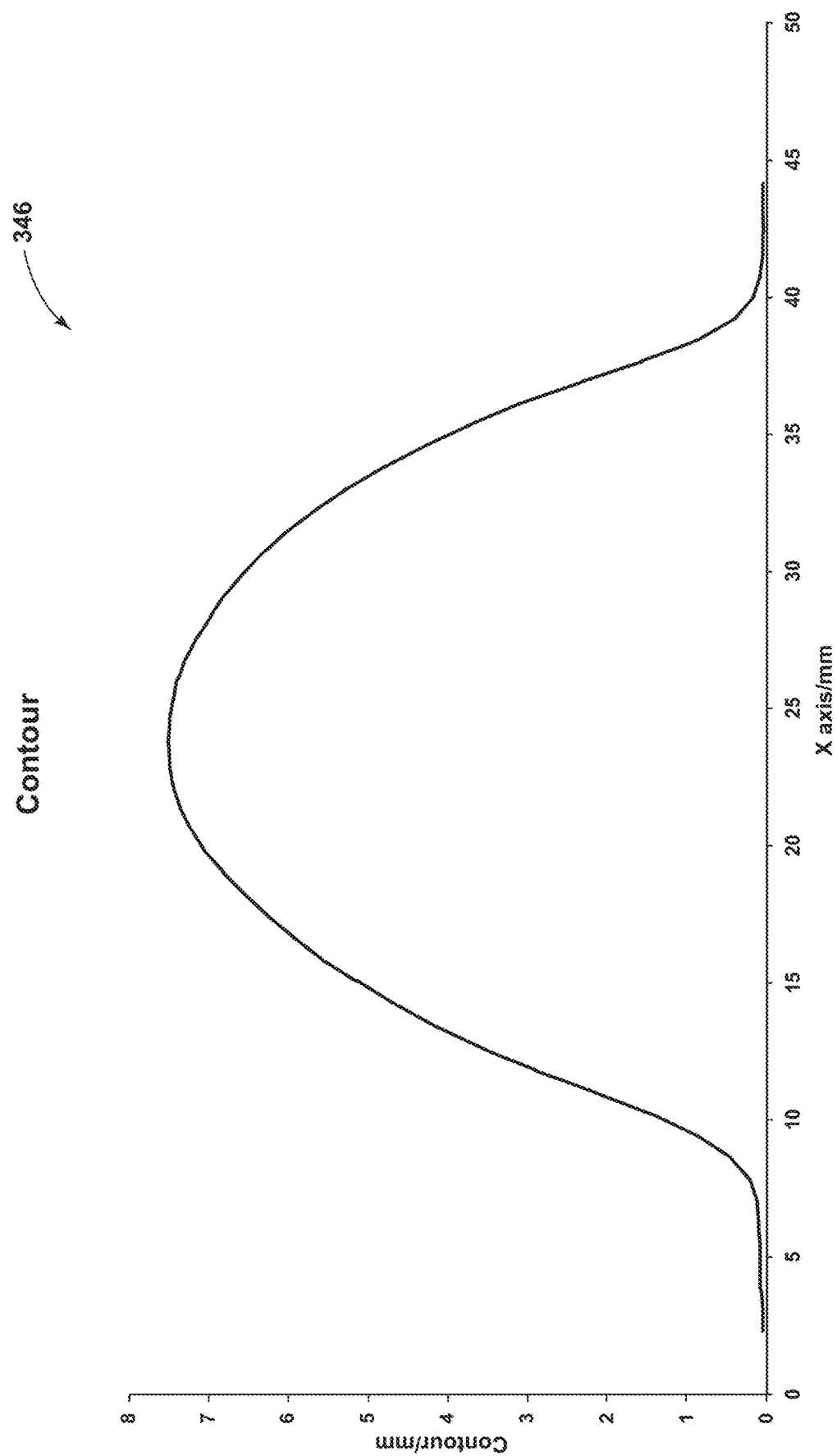
FIG. 9 is a graphical view of the out-of-plane contour crossing the line in FIG. 8A

A specimen or object used 102 for a morphology test, such as generally illustrated in FIG. 5A, may include a flat aluminum plate with a cylindrical bulge 330 in the center. The height (e.g., in a direction of the camera 110) of the bulge 330 may be about 7.5 mm (e.g., as measured using a caliper). A system 100 may be placed in front of the object 102, and a captured color image 332 is generally illustrated in FIG. 5B. FIGS. 6A and 6B show two views 334, 336 with different views obtained after extracting the red and blue components, respectively, from the raw color image 332. In FIGS. 5B, 6A, and 6B, the red component is generally represented with solid lines rising to the right and the blue component is generally represented with dashed lines rising to the left. The gray images 338, 340 of the two views 334, 336, obtained after graying the views, are generally illustrated in FIGS. 7A and 7B, respectively. To perform the evaluation, calibration may be performed using a calibration plate, and the calibration images may be extracted using the same method as previously described. The evaluated data of the contour 342 and the estimated error 344, evaluated using a commercial conventional 3D-DIC evaluation method, are generally illustrated in FIGS. 8A and 8B, respectively. FIG. 9 shows the out-of-plane contour 346 crossing the line A-A in FIG. 8A. As shown, the peak of the contour is 7.505 mm, and the greatest error of the whole-field is around 0.01 mm.

Figure 3:
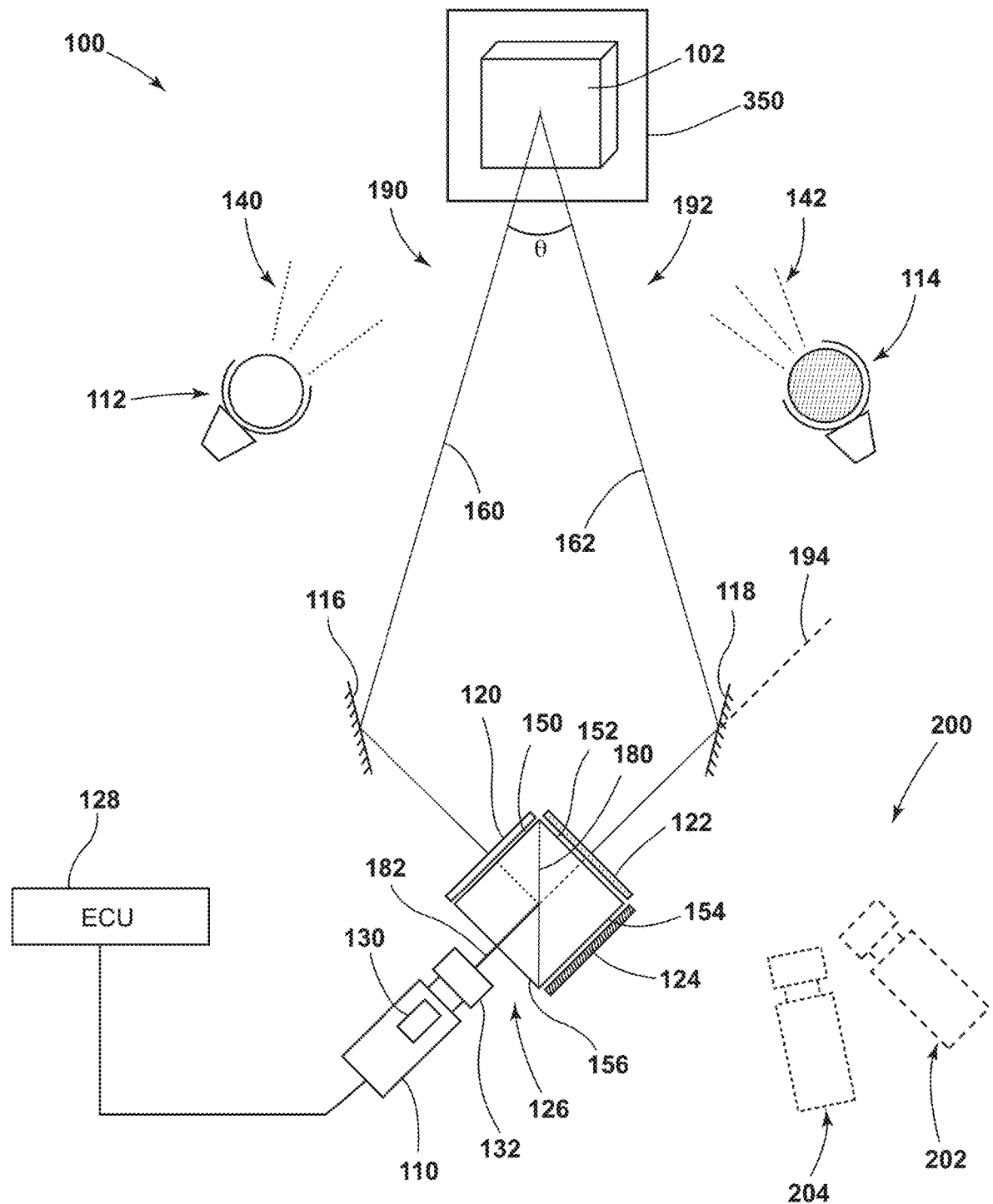
FIG. 3 is a schematic view of a test used in connection with an imaging system according to aspects or teachings of the present disclosure and a conventional 3D-DIC system.

A rigid-body movement test may be performed to validate the accuracy of the displacement measurement using embodiments of system 100. A test apparatus 350, such as a 2D-linear translation stage with an object 102 (e.g., a flat plate) connected to it, may be placed in the front of the system 100. An example of a test setup is generally illustrated in FIG. 3. A surface of the object 102 may be carefully adjusted to coincide with the x-axis of the 2D-linear translation stage 350. Rigid-body movement of the object 102 may be controlled by the 2D-linear translation stage and/or an ECU 128. Movement of the object 102 in both the in-plane (x-direction) and out-of-plane (z-direction) may be tested in various ranges and intervals, such as, for example and without limitation, from 0 mm to 2.5 mm with 0.5 mm intervals. Processing may proceed in a manner similar to and/or the same as the morphology test. Displacement of a point in the center of the object 102, actual and as obtained via a system 100, is generally shown in Table 1.

TABLE 1

Results of rigid-body movement test

| Step No. | Displacement/ mm (actual) | X Displacement via system 100 | X Error/mm | Z Displacement via system 100 | Z Error/mm |
|---|---|---|---|---|---|
| 0 | 0 | 0 | 0 | 0 | 0 |
| 1 | 0.5 | 0.501261 | 0.001261 | 0.488624 | 0.013376 |
| 2 | 1 | 1.00919 | 0.00919 | 0.981836 | 0.018164 |
| 3 | 1.5 | 1.51107 | 0.01107 | 1.52024 | 0.02024 |
| 4 | 2 | 1.98793 | 0.01207 | 2.01798 | 0.01798 |
| 5 | 2.5 | 2.5144 | 0.0144 | 2.48872 | 0.01128 |

Embodiments of a system 100 may be used in connection with strain measurement. A tensile test may be performed to validate the strain measurements of system 100. For example and without limitation, a dog-bone shaped object 102 may be stretched until fracture, and an embodiment of system 100 may be used to measure the tensile strain at a certain gauge length. Meanwhile, a commercial 3D-DIC system 200 may be used (e.g., simultaneously) to compare the result. An example setup of this tensile test with an embodiment of a system 100 and a commercial 3D-DIC 200 is generally illustrated in FIG. 3 (the test apparatus 350 may include a different configuration than when used in connection with a rigid-body movement test).

Figures 10A, 10B:
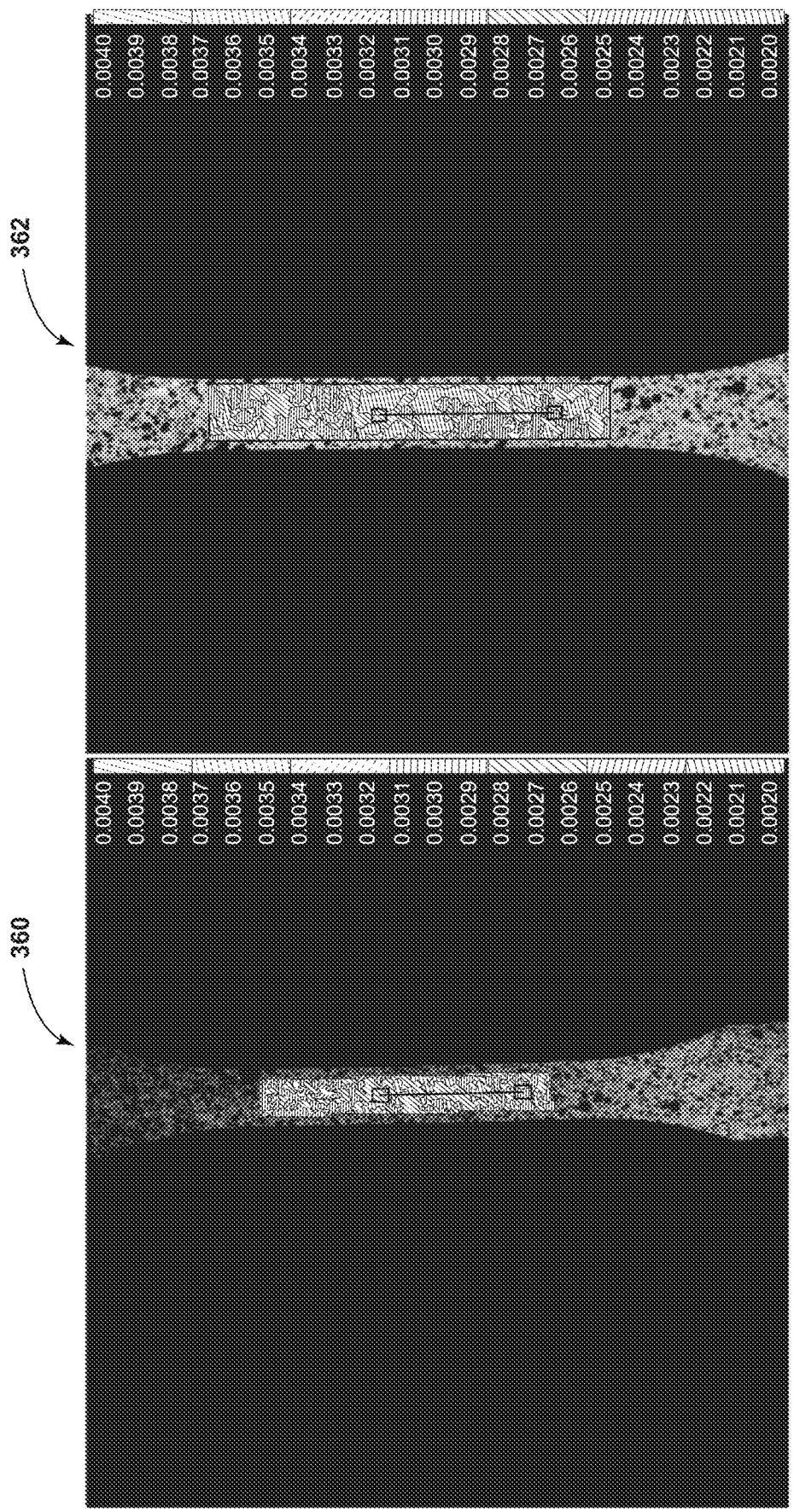
FIG. 10A is a standard deviation distribution of strain generated via an embodiment of an imaging system according to aspects or teachings of the present disclosure.
FIG. 10B is a standard deviation distribution of strain generated via a conventional 3D-DIC system.
Figure 11A:
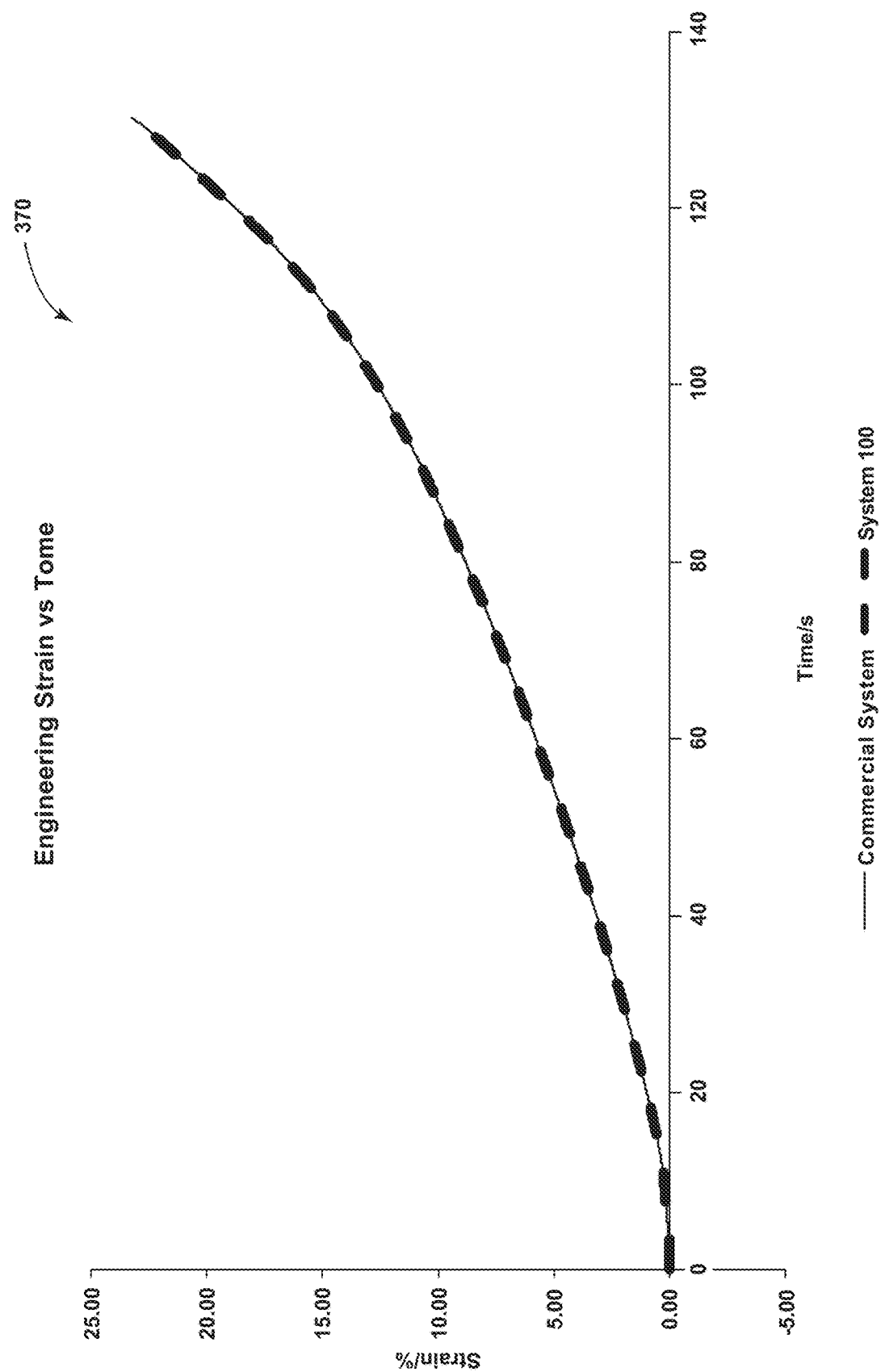
FIG. 11A is a graphical view of engineering strain measured via an embodiment of an imaging system according to aspects or teachings of the present disclosure and via a conventional 3D-DIC system.
Figure 11B:
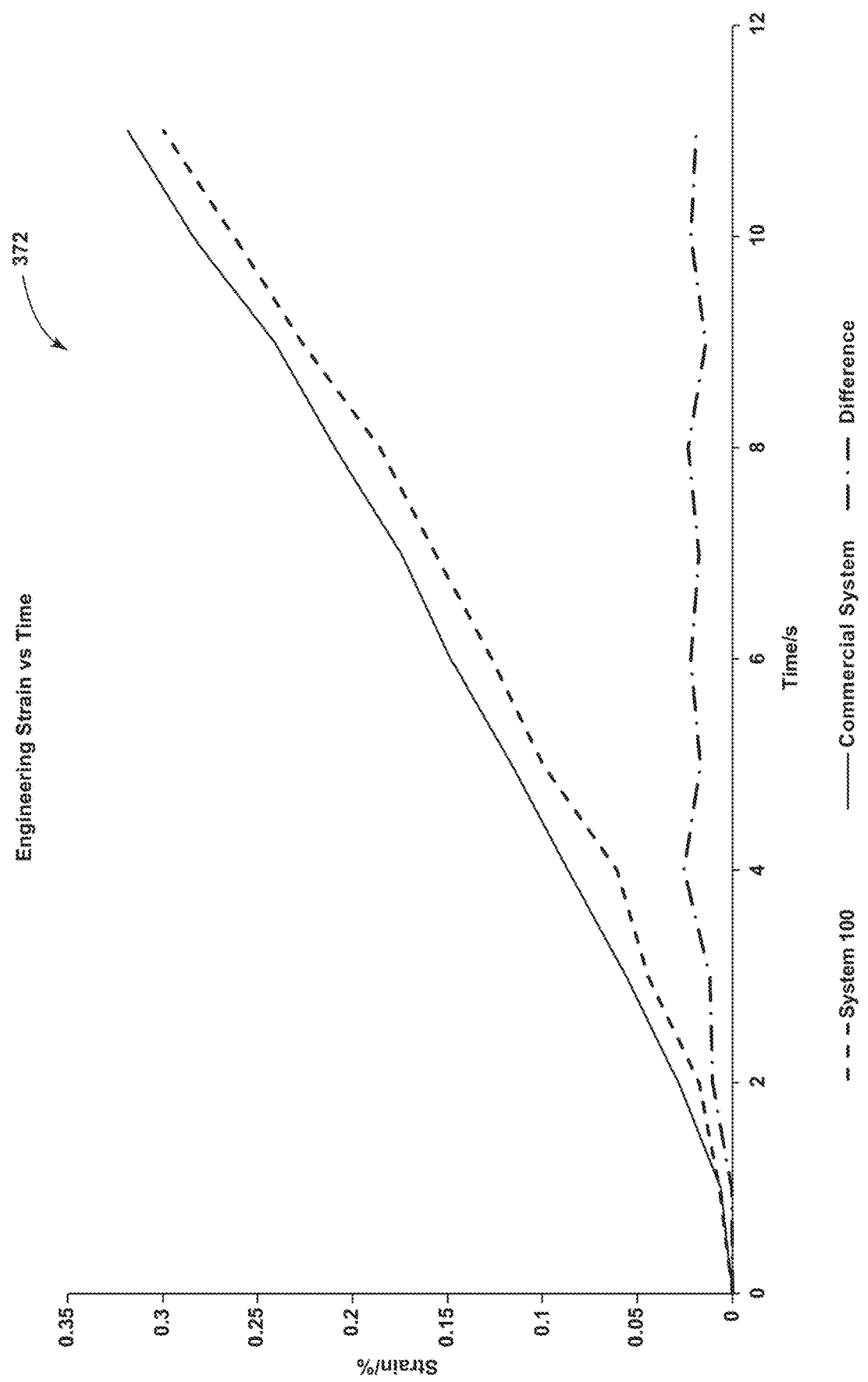
FIG. 11B is a graphical view of engineering strain measured via an embodiment of an imaging system according to aspects or teachings of the present disclosure and via a conventional 3D-DIC system.

The engineering strain of a 25 mm gauge length line, for example, may be measured at the same position by the systems 100, 200. Standard deviations distributions 360, 362 of the strain are generally illustrated in FIG. 10A (system 100) and FIG. 10B (commercial system 200). In the provided example, the cloud maps show the standard deviation of the local strain, which is around 0.2%. FIG. 11A generally illustrates the measured engineering strain data obtained by the two systems 100, 200 plotted in the same graph 370. As generally illustrated, the results obtained by both systems 100, 200 may be fairly similar. To observe the difference between the results more clearly, the measured strain in the first 10 seconds may be compared and displayed, such as in the graph 372 illustrated in FIG. 11B. As generally illustrated, the results from a system 100 may be slightly smaller than those obtained from the commercial system 200. In the provided example, the difference may be generally constant at around 0.02%.

Embodiments of a system 100 may include one or more advantages relative to other systems. For example and without limitation, embodiments of a system 100 may include a single camera design that may be less sensitive to vibration than systems with two cameras, such as commercial 3D-DIC systems 200 with cameras 202, 204 (see, e.g., FIG. 3). Vibration may change the positions of multiple cameras relative to each other, which may cause a decorrelation problem and/or inaccurate or failed measurements. Using two cameras may also add complexity to the system and may make the system more expensive. For example and without limitation, if more than one camera is used, an accurate trigger system may be required for the synchronization between the cameras. Embodiments of the present disclosure may not include a trigger system, which may reduce complexity and/or cost. Also, the angle between two cameras in a conventional 3D-DIC system 200 is often set to around 15-30 degrees. In situations where measurements of small areas are desired, the size of the camera may be too big to keep this angle (e.g., the ideal camera positions overlap). A system 100 may be easily configured for small test areas. For example, and without limitation, embodiments of a system 100 may be configured to obtain measurements of areas of 1 mm×1 mm or even smaller, which may be especially useful for evaluating steel or other metals (although a system 100 may be used in connection with a wide variety of materials).

Embodiments of a system 100 may be used in one or more of a variety of applications. For example, and without limitation, a system 100 could be used in automobile testing (e.g., vibration issues with previous systems, such as conventional system 200, may not be an issue with system 100). Additionally or alternatively, a system 100 may be used, for example, in ultra-high-speed tests, such as crash tests, as synchronizing triggers may not be an issue. A system 100 may not include any prisms or biprisms and/or may not involve refraction.

With embodiments, a system 100 may include an electronic control unit (ECU) 128. In embodiments, an ECU 128 may include an electronic controller and/or include an electronic processor, such as a programmable microprocessor and/or microcontroller. In embodiments, an ECU 128 may include, for example, an application specific integrated circuit (ASIC). An ECU 128 may include a central processing unit (CPU), a memory, and/or an input/output (I/O) interface. An ECU 128 may be configured to perform various functions, including those described in greater detail herein, with appropriate programming instructions and/or code embodied in software, hardware, and/or other medium. In embodiments, an ECU 128 may include a plurality of controllers. In embodiments, an ECU 128 may be connected to a display, such as a touchscreen display.

In embodiments, an ECU 128 may be configured to control one or more portions or functions of a system 100.

For example and without limitation, an ECU 128 may be configured to control a first light source 112, a second light source 114, and/or a camera 110. Additionally or alternatively, an ECU 128 may be configured to analyze information (e.g., images, intensities, etc.) obtained via a camera 110 and may be configured to determine one or more of a shape, size, deformation, and strain of a test object 102 according to information obtained via the camera 110.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

It is intended that all matter contained in the above description or shown in the accompanying drawings shall be interpreted as illustrative only and not limiting. Changes in detail or structure may be made without departing from the present disclosure.

What is claimed is:

1. An imaging system, comprising:
   a first light source configured to provide a first light to an object;
   a second light source configured to provide a second light to said object;
   a camera configured to capture an image of said object, the image including the first light and the second light;
   a first mirror disposed optically between the camera and said object;
   a second mirror disposed optically between the camera and said object;
   a beam splitter disposed optically between the camera and said object;
   a first filter for the first light source;
   a second filter for the second light source; and
   an electronic control unit configured to determine at least one of a shape, a deformation, and a strain measurement of said object from the image;
   wherein the first filter is disposed optically between the first mirror and the beam splitter, and the second filter is disposed optically between the second mirror and the beam splitter.

2. The imaging system of claim 1, wherein the first light source is configured to provide red light and the second light source is configured to provide blue light.

3. The imaging system of claim 1, wherein the first light source and the second light source are configured to provide different colors of light.

4. The imaging system of claim 1, wherein the camera is a single, color camera and the imaging system does not include any other cameras.

5. The imaging system of claim 1, wherein the first light source is set stronger than the second light source.

6. The imaging system of claim 1, wherein the image includes a first full view of the object corresponding to the first light and a second full view of the object corresponding to the second light, and the first full view and the second full view each simultaneously occupy more than half of a sensor of the camera.

7. An imaging system, comprising:
   a first light source configured to provide a first light to an object;
   a second light source configured to provide a second light to said object;
   a camera configured to capture an image of said object, the image including the first light and the second light;
   a first mirror disposed optically between the camera and said object;
   a second mirror disposed optically between the camera and said object;
   a beam splitter disposed optically between the camera and said object;
   a first filter for the first light source;
   a second filter for the second light source; and
   an electronic control unit configured to determine at least one of a shape, a deformation, and a strain measurement of said object from the image, wherein the first filter is connected to a first side of the beam splitter, the second filter is connected to a second side of the beam splitter, a light barrier is connected to a third side of the beam splitter, the first side and the third side are disposed in parallel with each other, and the second side is disposed perpendicular to the first side and the third side.

8. The imaging system of claim 7, wherein the camera is directed toward a fourth side of the beam splitter, and the second side and the fourth side are disposed in parallel with each other.

9. An optical method, the method comprising:
providing a first light source and a second light source;
providing one camera;
providing a first light from the first light source to an object;
providing a second light from the second light source to said object;
providing a first mirror, a first filter, and a beam splitter in an optical path of the first light between said object and the camera;
providing a second mirror, a second filter, and the beam splitter in an optical path of the second light between said object and the camera;
obtaining an image of the object via the camera, the image including a reflection of the first light and a reflection of the second light; and
determining, with an electronic control unit, at least one of a size, shape, a deformation, and a strain measurement of said object according to the image;
wherein the first filter is provided in the optical path of the first light between the first mirror and the beam splitter.

10. The method of claim 9, wherein the second filter is provided in the optical path of the second light between the second mirror and the beam splitter.

11. The method of claim 9, wherein the first light source is set stronger than the second light source.

12. The method of claim 9, wherein an evaluated area of the object is about 1 mm by about 1 mm or smaller.

13. The method of claim 9, wherein determining the at least one of the shape, the deformation, and the strain measurement of said object includes transforming color components of the image into gray components.

14. The method of claim 13, wherein determining the at least one of the shape, the deformation, and the strain measurement of said object includes flipping at least one of the color components.

15. The method of claim 9, wherein the reflection of the first light and the reflection of the second light each simultaneously occupy more than half of a sensor of the camera.

16. An optical method, the method comprising:
providing a first light source and a second light source;
providing one camera;
providing a first light from the first light source to an object;
providing a second light from the second light source to said object;
providing a first mirror, a first filter, and a beam splitter in an optical path of the first light between said object and the camera;
providing a second mirror, a second filter, and the beam splitter in an optical path of the second light between said object and the camera;
obtaining an image of the object via the camera, the image including a reflection of the first light and a reflection of the second light; and
determining, with an electronic control unit, at least one of a size, shape, a deformation, and a strain measurement of said object according to the image;
wherein the beam splitter is a beam splitter cube, the reflection of the first light enters through a first side of the beam splitter, the reflection of the second light passes through a second side of the beam splitter; a light shield is connected to a third side of the beam splitter; and, the reflection of the first light and the reflection of the second light exit the beam splitter via a fourth side of the beam splitter.

17. The method of claim 16, wherein the first side and the third side are disposed in parallel and the second side and the fourth side are disposed in parallel.

18. An optical method, the method comprising:
providing a first light source and a second light source;
providing one camera;
providing a first light from the first light source to an object;
providing a second light from the second light source to said object;
providing a first mirror, a first filter, and a beam splitter in an optical path of the first light between said object and the camera;
providing a second mirror, a second filter, and the beam splitter in an optical path of the second light between said object and the camera;
obtaining an image of the object via the camera, the image including a reflection of the first light and a reflection of the second light; and
determining, with an electronic control unit, at least one of a size, shape, a deformation, and a strain measurement of said object according to the image;
wherein the first filter is connected to and/or aligned with a first side of the beam splitter, the second filter is connected to and/or aligned with a second side of the beam splitter, a light shield is connected to and/or aligned with a third side of the beam splitter, the camera is aligned with a fourth side of the beam splitter, and the first side and the third side are disposed perpendicular to the second side and the fourth side.

* * * * *